June 9, 1959     H. W. NAULTY ET AL     2,889,955

INERT GAS SYSTEM FOR FUEL TANK

Filed Aug. 14, 1953

INVENTORS
HOWARD W. NAULTY
MALCOLM N. BROWN

BY

ATTORNEYS

United States Patent Office 2,889,955
Patented June 9, 1959

2,889,955

INERT GAS SYSTEM FOR FUEL TANK

Howard W. Naulty, East Aurora, and Malcolm N. Brown, Kenmore, N.Y., assignors to the United States of America as represented by the Secretary of the Navy Application August 14, 1953, Serial No. 374,456

6 Claims. (Cl. 220—88)

This invention relates to apparatus for preventing formation of explosive air-gas mixtures in the vicinity of fuel tanks, with special application to aircraft.

In the use of liquid fuels, such as gasoline, the vapors present above the liquid in closed containers are not only inflammable but under certain conditions of air mixing may become explosive. To reduce this hazard, which is particularly real in aircraft, it has been proposed to replace the normal fuel atmosphere with an inert gas and this procedure under normal conditions has been found adequate. Under abnormal conditions, however, such as develop in combat aircraft, tank leakage may result in inflammable or explosive gas mixtures external to the fuel tank, these mixtures penetrating aircraft compartments, such as the cabin or tank enclosures thus presenting an extremely hazardous condition.

The outstanding object of the present invention, therefore, is to provide apparatus operative to reduce danger of fire or explosion in compartments external to the fuel container.

Another object is to provide apparatus which automatically adjusts the flow of inert gases to the fuel control chambers in accordance with the ambient air pressure.

Still another object is to provide apparatus for modifying inert gas flow with the intake pressure of the inert gas.

Other objects include the provision of protective pressure relief for super and subatmospheric pressures in the fuel tank; the provisions of means for adjusting inert gas flow according to the external air temperature; and other objects and advantages which will appear on reference to the following detailed description and the accompanying drawings, in which.

Figure 1:
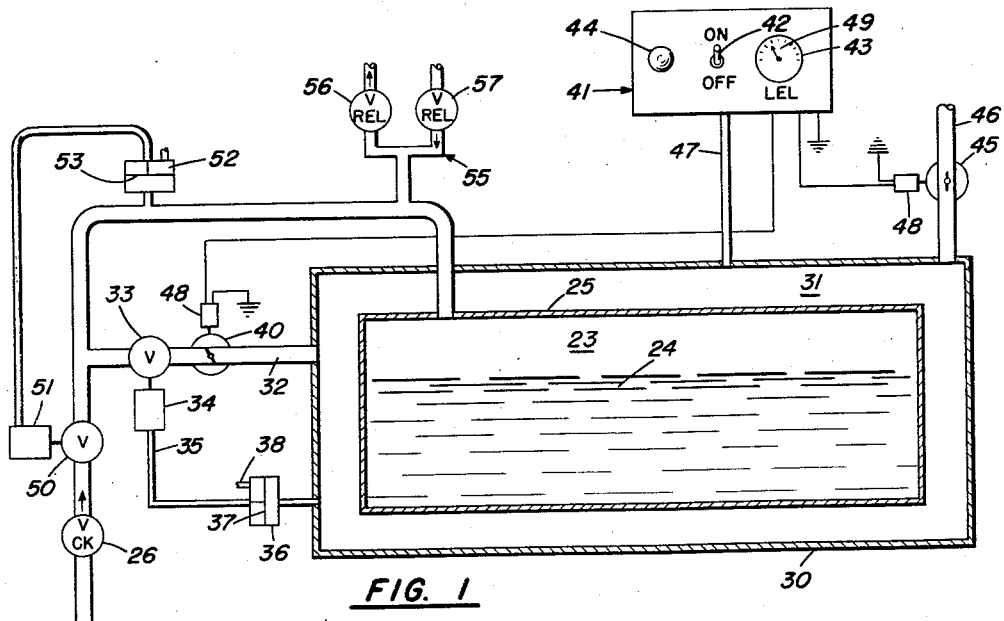
Fig. 1 is a diagrammatic view showing the complete apparatus.

Reference is made to Fig. 1. In this figure the tube 10 forms the exhaust of an internal combustion engine 11. A tube 12 receives inert exhaust gas from tube 10 through a heat and corrosion resistant nozzle tip 14 connected to tube 10 and turned upstream at its end to receive the outflow of exhaust gases at exit pressures. Tube 12 leads to the heat exchanger or cooler 15, which may take the form of a coil extension 16 of tube 12, a container 17, an air inlet 18 and outlet 19 to container 17, and a condensate drain 20 arranged to drain condensate from tube 16 at the container base. A valve 27 is placed in the cooler outlet 19, this valve being electrically operated as by a solenoid unit 28 in accordance with the temperature state of thermal pick-up 29. In this manner, freezing of the condensate of cooler 15 is prevented, the air flow being reduced when the gas temperature at the thermal pick-up is reduced. Leading from the cooler 15 is a tube 22 which encloses pick-up 29 and has connection with the upper interior space 23 above the fuel 24 in fuel tank 25. A check valve 26 is inserted in tube 22 to prevent reverse flow from the tank to the heat exchanger 15.

Surrounding and spaced from tank 25 by any appropriate means, is an enclosing compartment 30 which may be of wing skin, bulkhead or other airplane structural material, the space 31 between the tank and compartment being utilized for control of leakage from the tank. A branch tube 32 leads from tank tube 22 to the space 31 of compartment 30. In this branch tube is mounted a flow control valve 33 actuated by a pressure device 34 which in turn is connected by a duct 35 to compartment space 31 through a differential pressure unit 36. This unit is provided with a diaphragm 37 on one side subject to atmospheric pressure through open tube 38 and on the other side to the gas in compartment space 31, the movement of this diaphragm being communicated to the pressure device 34 and thereby to the valve 33 to control the gas flow to compartment space 31.

In addition to valve 33, branch tube 32 is provided with an electrically operated valve 40, one end of the control circuit being grounded at the valve and the other end connected to a combustible gas detector 41. This detector may be of any known type sensitive to fuel constituents, the usual construction including chemical absorption elements, with electrical metering devices. As shown the detector is provided with switch 42, meter 43 indicating the air-fuel percentages and a light transmitting element 44 for transmitting light from a lamp included in the circuit. A second electrically actuated valve 45 is operatively connected to the detector and controls gas flow to the atmosphere from compartment space 31 through outlet tube 46. A tube 47 connects the space 31 to the detector 41 to supply gas thereto for analysis. It is noted that the actuating means of valves 40 and 45 may be any well known means such as solenoids 48; and that the meter needle 49 may close successive circuits to operate valves 40 and 45 at predetermined percentage values of combustible gas content in the tank-casing space.

In addition to check valve 26 in the inert gas line 22, a differential pressure valve 50 is provided between the check valve and tank 25. This valve is actuated by diaphragm mechanism similar to that actuating valve 33, including pressure device 51 and differential device 52, open on one side of a diaphragm 53 to the atmosphere and on the other side to the space 23 inside tank 25. Tube 22 is also provided with the dual pressure release unit 55 including blowout valve 56 for relief of excess pressure in the tank and connecting pipe line and vacuum breaker valve 57 for preventing tank collapse under certain operating conditions.

Having detailed the structural elements of the apparatus the operation will now be described. It is first assumed that detector valve 40 is closed and valve 45 opened, and that the pressure of the exhaust in 10 is moderate as distinguished from high pressure exhaust, taken off, for example, between the engine and a turbo supercharger or from the burner can of a jet engine. It is further assumed that the tank and enclosing compartment are located in the fuselage adjoining a non-pressurized cabin, the cabin occupants, therefore, being not only adjacent the potentially explosive and inflammable tank but also subject to leakage of exhaust gases from the tank and tank compartment.

The inert gases pass from the nozzle 14 to the cooler 15 where atmospheric air flowing over the cooler tubes reduces the high gas temperature. From the cooler, the gas passes through the check valve 26 and open valve 50 to the space 23 in the tank above the fuel. Thus, the inflammable tank gases are diluted by the inert exhaust gases to a point substantially below the explosion point.

In case the tank now develops leakage into space 31, the combustible content of the gas in this space will increase to a point where, at a predetermined fuel percentage, the valve 40 will open thereby establishing a flow circuit for the exhaust through tube 32, space 31 and outlet tube 46, and thus replacing the inflammable gases with exhaust gas. At a predetermined fuel percentage value brought about by the purging action of the exhaust gases, detector 41 functions to close valve 45. On opening of valve 40 the lamp 44 lights in the detector 41 and remains lit until a reset switch in the detector casing is closed. Thus the lighted lamp is an indication to the ground crew of tank leakage. Switch 42 may be operated at will to restore valves 40 and 45 to their respective original closed and opened positions.

Figure 2:
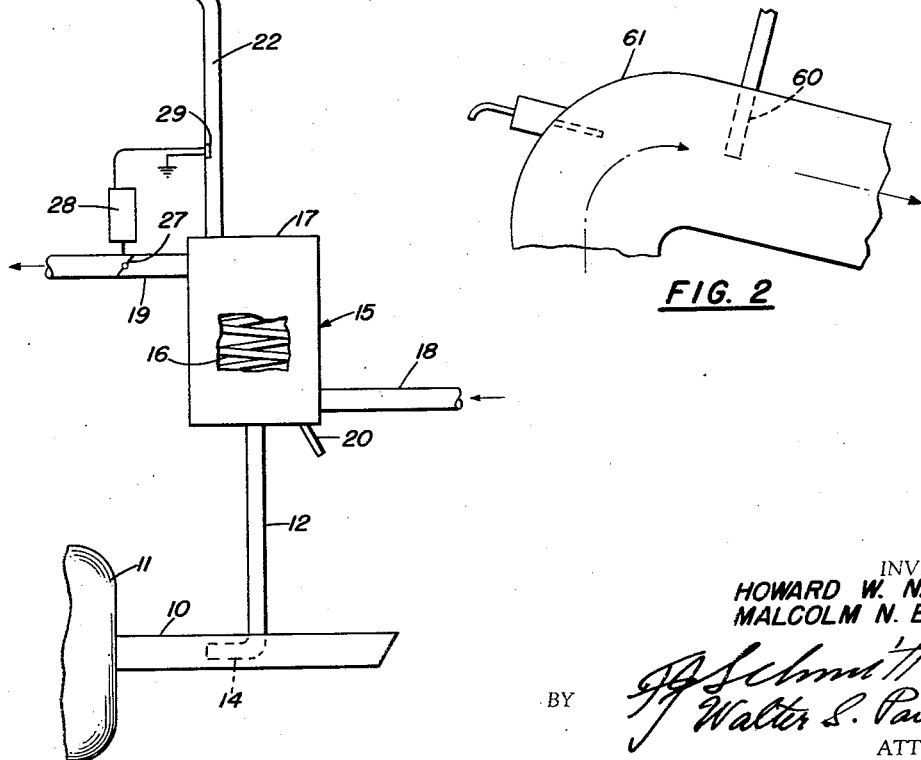
Fig. 2 is a detail showing the application of the inert gas intake to a high pressure source, such as the burner can of a jet engine.

By the described means, therefore, exhaust gases normally are prevented from entering space 31 and the likelihood of leakage of these gases to the cabin is reduced. However, should tank leakage develop producing a potentially dangerous mixture in space 31, the valves automatically move to sweep this mixture out through tube 46, and the detector light immediately notifies the cabin occupants of tank leakage. If during this operation the pressure in the space 31 becomes excessive in relation to atmospheric pressure while valve 40 is open, the pressure controlled valve 33 moves to reduce the valve opening and thereby the exhaust gas flow to the space 31, so that a uniform pressure is maintained in this space. By this pressure control it becomes possible to reduce the capacity of the system including the heat exchanger 15 without affecting the effectiveness of operation. Where the exhaust gas is obtained from a high pressure source it may be preferable to use a straight pick-up tube 60 (Fig. 2), extending radially from the pressure tube 61. Under this condition of high initial inlet pressure, it becomes desirable to reduce the pressure at the tank; and this may readily be accomplished by use of the differential pressure valve control 50—51—52 of Fig. 1 which insures a reduction in gas flow with increase in inlet pressure above predetermined minimum values.

The apparatus has been described as employed on aircraft having a non-pressurized cabin and with the fuel tank located in the fuselage. Where the cabin is pressurized the detector 41 and associated valves 40 and 45 may be omitted as the cabin pressure prevents entrance of undesired gases. In cases where the fuel tank is outside the fuselage the detector unit may be omitted, as well as the pressure differential valve 33, if the tank enclosure 30 is leak-proof. Where the enclosure is not leak-proof, the valve 33 is desirable to prevent development of excessive exhaust gas pressures in space 31.

While the invention has been described from the view point of aircraft it is apparent that the apparatus has general application to fuel tanks containing inflammable or explosive fuel subject to leakage. Also, it is obvious that modifications and variations of the invention are possible, it being understood that within the scope of the appended claims the invention may be practiced otherwise than as specifically described.

What is claimed is:

1. In protective apparatus for fuel tanks, the combination comprising a fuel tank, a casing forming a spaced enclosure about said tank, a source of inert gas under pressure, a main tube connecting said source with said tank, a branch tube connecting the casing with said main tube, a valve within and normally closing said branch tube, and means for opening said valve only on entrance of fuel gas into said enclosure, said enclosure being normally free of fuel gas.

2. Protective apparatus as defined in claim 1 including an atmospheric outlet tube connected to said casing, a valve in said outlet tube, said means for opening the valve in said branch tube including a detector of combustible gases, a tube connecting said detector and the space between said tank and casing, electrical means for actuating said valves in the branch and outlet tubes, and automatic switch means connected to said detector for opening said branch tube valve and closing said outlet valve in time succession when the combustible gas in said casing space reaches a predetermined fuel percentage value, whereby said combustible gases are removed from said casing space.

3. In protective apparatus for fuel tanks of internal combustion engines developing in use high temperature exhaust gases, the combination including a fuel tank, a casing forming a spaced enclosure about said tank, a main tube connecting the exhaust pipe of said engine to said tank, a branch tube connecting the casing to said main tube, and a cooler unit inserted in said main tube, said unit including a casing, an inlet casing tube for coolant, an outlet casing tube for coolant, an outlet tube for condensate, a valve in said outlet casing tube, means for actuating said outlet tube valve, and thermal means in said main tube for energizing said outlet tube valve actuating means to reduce the flow of coolant in accordance with reduction in main tube temperatures.

4. Protective apparatus as defined in claim 1 including a valve in said main tube between said gas source and the junction between the main and branch tubes, and pressure-differential means responsive to the difference between atmospheric pressure and the pressure in the main tube for actuating the valve in said main tube whereby the flow of gas past said main tube valve may be reduced upon an increase of pressure of said source of inert gas.

5. Protective apparatus as defined in claim 4 including a second valve in said branch tube, and pressure-differential means connected to atmosphere and to said second branch tube valve and actuated by the difference in pressure between the tank-casing space and atmosphere for holding the tank-casing space pressure constant.

6. In protective apparatus for fuel tanks, the combination comprising a fuel tank, a casing forming a spaced enclosure about said tank, a source of inert gas under pressure, a main tube connecting said source with said tank, a branch tube connecting the casing with said main tube, cooling means in said main tube for cooling the gas received from said source, temperature control means connected to said main tube and said cooling means for controlling the temperature of the gas flowing through said cooling means, valve means between said branch tube and said gas source operated responsive to the difference between the tank pressure and atmospheric pressure for controlling the flow of gas in said main tube, valve means in said branch tube operated responsive to the difference between the gas pressure in said casing and atmospheric pressure for controlling the gas flow in said branch tube, second valve means in said branch tube normally in a closed position, an outlet tube connected to said casing, a valve in said outlet tube normally in an open position, and fuel gas detection means connected to said casing, to said second valve means and to said valve in the outlet tube whereby the second valve means may be opened when the gas in the space around the tank reaches a predetermined fuel percentage value thereby establishing a flow circuit for said inert gas into said space, and the outlet tube valve closed after the fuel percentage value has been reduced.

References Cited in the file of this patent

UNITED STATES PATENTS

| | | |
|---|---|---|
| 2,049,987 | Willenborg | Aug. 4, 1936 |
| 2,153,555 | Gallery | Apr. 11, 1939 |
| 2,366,146 | Martin-Hurst | Dec. 26, 1944 |
| 2,375,834 | Walker | May 15, 1945 |

FOREIGN PATENTS

| | | |
|---|---|---|
| 150,053 | Great Britain | Aug. 24, 1920 |
| 467,334 | Great Britain | June 14, 1937 |
| 529,635 | Great Britain | Nov. 26, 1940 |
| 524,826 | France | May 21, 1921 |